United States Patent [19]

McCree et al.

[11] Patent Number: 5,694,426
[45] Date of Patent: Dec. 2, 1997

[54] SIGNAL QUANTIZER WITH REDUCED OUTPUT FLUCTUATION

[75] Inventors: Alan V. McCree, Dallas; Vishu R. Viswanathan, Plano, both of Tex.

[73] Assignee: Texas Instruments Incorporated, Dallas, Tex.

[21] Appl. No.: 487,742

[22] Filed: Jun. 7, 1995

Related U.S. Application Data

[62] Division of Ser. No. 245,090, May 17, 1994.

[51] Int. Cl.⁶ .................................................. H04B 14/04
[52] U.S. Cl. ................................................ 375/243; 395/2.39
[58] Field of Search ..................................... 375/243, 245; 348/404, 405, 406; 395/2.39, 2.42; 341/200

[56] References Cited

U.S. PATENT DOCUMENTS 4,817,157  3/1989  Gerson ..................................... 381/40

*Primary Examiner*—T. Ghebretinsae
*Attorney, Agent, or Firm*—Robert L. Troike; W. James Brady, III; Richard L. Donaldson

[57] ABSTRACT

A new signal quantization scheme is proposed which reduces fluctuation of the output signal by a signal quantizer (10) providing a quantized output signal and multiplying (18) said input signal X by a factor $(1-w_1)$ and finding a difference signal $\Delta_{in}$ (11) between both the input signal and the previous input signal and multiplying (16) that by a weighting factor $w_2$ from a control (13). The previous quantizer output signal $Q_{prev}$ is summed (17) with the weighted difference signal $\Delta_{in}w_2$ and the sum is weighted by a weighting factor $w_1$ at a multiplier (19) to yield $w_1(Q_{prev}+w_2\Delta_{in})$. This signal is then summed at an adder (21) and applied to the quantizer (10) so that the quantizer is forced to match the fluctuation in the input signal as well as the signal itself. When applied to speech encoding algorithms such as the North American digital cellular telephone standard VSELP, the new quantizer results in more natural sounding background noise.

4 Claims, 4 Drawing Sheets

SIGNAL QUANTIZER WITH REDUCED OUTPUT FLUCTUATION

This is a division of application Ser. No. 08/245,090, filed May 17, 1994.

TECHNICAL FIELD OF THE INVENTION

This invention relates to a signal quantizer and more particularly to a signal quantizer that has reduced output fluctuation.

BACKGROUND OF THE INVENTION

Digital encoding of signals is becoming increasingly important in the modern era of digital communication and storage. One problem with many sophisticated source coding algorithms is that they do a poor job of reproducing the background noise when no signal is present, since the encoding is designed to match the characteristic of a typical input signals. For example, the VSELP speech coding algorithm, which is the North American digital cellular telephone standard IS54, introduces fluctuations into the background noise generated in an automobile, resulting in an annoying perceptual effect sometimes known as "swirling".

An important step in any digital coding system involves quantization of a signal, where the signal is represented by one of a finite number of possible values. In simple waveform quantization, samples of the input signal are directly quantized, while in more sophisticated coding schemes some model parameters based on transformations of the input signal may be quantized. A typical quantizer is represented by FIG. 1.

In traditional quantization schemes, a range of possible output values is searched for the output which matches the input value with the least possible error, where the error is defined as:

$$E=|Q-X|^2$$

where Q represents the quantizer output value, X represents the quantizer input, and $|Y|^2$ represents the square of the value of Y in the case of scalar quantization or the squared norm of the vector Y in the case of vector quantization. The squared norm is defined as the inner product of a vector with itself:

$$|Y|^2=(Y, Y)$$

SUMMARY OF THE INVENTION

A new signal quantization scheme is provided which reduces fluctuation of the output signal by modeling both the input signal and the variation of the input signal with time. The error which is minimized by the quantizer search algorithm is modified to include an additional term corresponding to the difference between the current and previous input signals, so that the quantizer is forced to match the fluctuation in the input signal as well as the signal itself.

DESCRIPTION OF PREFERRED EMBODIMENTS

Figure 1:
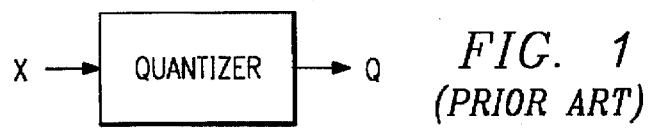
FIG. 1 is a block diagram representing a typical prior art normal quantizer.

The present invention introduces a novel signal quantization scheme which models both the input and the fluctuations in the input signal, so that the quantizer output will not fluctuate excessively for a stationary input. If a quantizer is to match both the input signal and the fluctuation in the input signal, the error measure defining the optimal quantizer output value must be modified. A simple measure of input fluctuation is the difference between the current input and the previous input, and a similar measure can be defined for the output fluctuation. Then a fluctuation-matching quantizer can be designed to minimize:

$$E=(1-w_1)|Q-X|^2+w_1|\Delta_{out}-w_2\Delta_{in}|^2$$

where $w_1$ and $w_2$ are weighing factors, $\Delta_{out}$ is the difference between the current and previous quantizer outputs, and $\Delta_{in}$ is the difference between the current and previous quantizer inputs.

To better understand the properties of this new error measure, we can re-arrange the terms as follows:

$$\begin{aligned} E &= (1-w_1)|Q-X|^2 + W_1|Q-Q_{prev}-W_2\Delta_{in}|^2 \\ &= (1-w_1)|Q-X|^2 + w_1|Q-Q'|^2 \\ &= (1-w_1)[|Q|^2 - 2\langle Q,X\rangle + |X|^2] + w_1[|Q|^2 - 2\langle Q,Q'\rangle + |Q'|^2] \\ &= |Q|^2 - 2\langle Q,(1-w_1)X+w_1Q'\rangle + (1-w_1)|X|^2 + w_1|Q'|^2 \\ &= |Q|^2 - 2\langle Q,X'\rangle - |X'|^2 + |X'|^2 + (1-w_1)|X|^2 + w_1|Q'|^2 \\ &= |Q-X'|^2 - |X'|^2 + (1-w_1)|X|^2 + w_1|Q'|^2 \end{aligned}$$

where $Q' = Q_{prev}+w_2\Delta_{in}$ and $X' = (1-w_1)X+w_1Q'$

Since the only term in this equation which depends on Q is the first term, anding the best quantizer output is equivalent to using a normal quantizer but replacing the quantizer input signal X with the new input:

$$X'=(1-w_1)X+w_1(Q_{prev}+w_2\Delta_{in})$$

For simple cases of $w_1$ and $w_2$, this quantizer is easier to analyze. For example, if wx is equal to zero, the quantizer reduces to the traditional quantizer since then $$X'=X$$

As another example, if $w_2$ is equal to zero then the quantizer input becomes:

$$X'=(1-w_1)X+w_1Q_{prev}$$

If, in addition, the quantizer is assumed to be a "perfect" quantizer so that Q is equal to X', we see that the new quantizer algorithm is simply reduced to one-pole smoothing of the input signal:

$$X'=(1-w_1)X+w_1X'_{prev}$$

On the other hand, if both $w_1$ and $w_2$ are equal to one, the quantizer will simply ignore the current input and match the fluctuation of the input signal, since the quantizer input then becomes:

$$X'=Q_{prev}+\Delta_{in}$$

Based on this analysis of special cases, we can make the following general statements about the performance of this new quantizer. First, the quantizer minimizes a weighted sum of the error in matching the input signal and the error in matching the fluctuation of the input signal. Second, both weights $w_1$ and $w_2$ are between 0 and 1, but each weighing factor performs a different function. Third, as $w_1$ approaches one, the quantizer will give increasing importance to matching the fluctuation rather than the input signal itself. Finally, as $w_2$ approaches zero, the amount of input fluctuation is scaled down so that the output signal will fluctuate less than the input.

Figure 2:
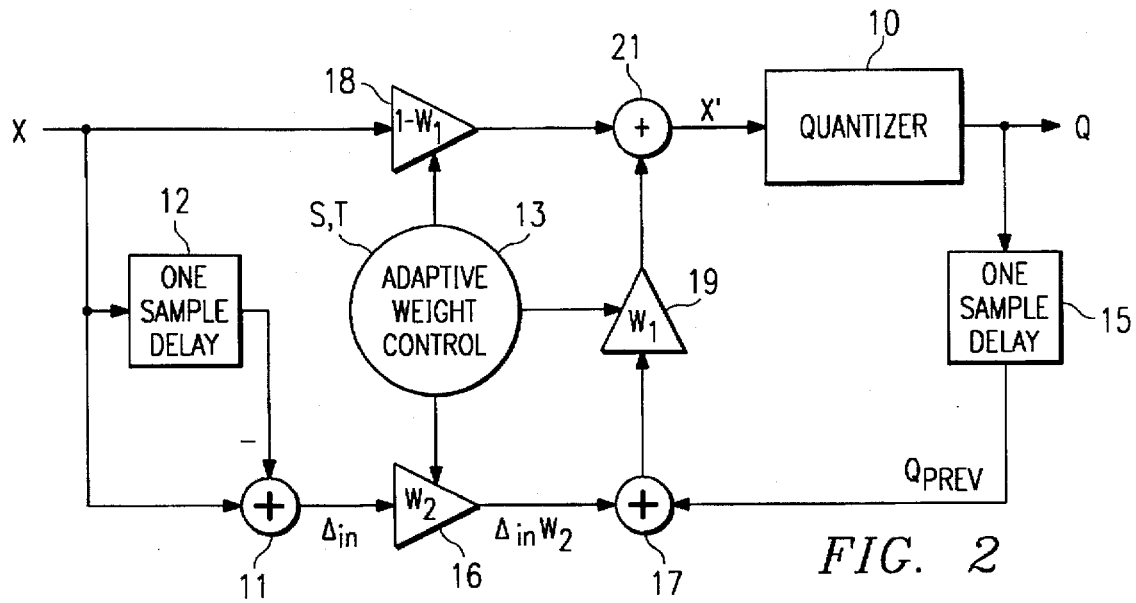
FIG. 2 is a block diagram of a quantizer according to the present invention.

Referring to FIG. 2 there is illustrated the quantizer of the subject invention utilizing the equations stated previously. The input signal to be quantized is X. One sample input delayed in delay 12 is subtracted from the next sample input signal at summer 11 to obtain difference signal $\Delta_{in}$. The input signal X is multiplied by the quantity $1-w_1$ factor at multiplier 18. The resultant difference value $\Delta_{in}$ from the one sample and the delayed sample is multiplied by a weight control factor of $w_2$ at multiplier 16. The weight factors $w_1$ and $w_2$ are provided by adaptive weight control 13 to be discussed later. The output from the quantizer 10 is provided to a one sample delay 15 to provide a previous quantized value $Q_{prev}$ at a summer 17. Summer 17 sums the output from the difference between the current and previous quantizer inputs or $\Delta_{in}$ multiplied by the weight factor $w_2$ and the previous quantized value $Q_{prev}$. The sum at summer 17 is then multiplied by the weighted value $w_1$ at multiplier 19. The output from multiplier 19, which is=$w_1(Q_{prev}+w_2\Delta_{in})$, is applied to the summer 21 to sum with output from the multiplier 21 which is X $(1-w_1)$ to thereby provide the new X' input to the quantizer 10, which then provides the new output Q. The weight coefficients $w_1$ and $w_2$ control the reduced-fluctuation properties of the quantizer, and should be adjusted based on the characteristics of the input signal. They may either be fixed for a given application, or adapted using time-varying input signal features such as power level and spectral tilt.

In accordance with one preferred embodiment of the present invention, this novel quantizer is utilized in the North American digital cellular speech coding system, VSELP, in order to improve the performance of the coder for acoustic background noise. In the standard coder, the quality is reduced when the speaker is not talking because the background noise is distorted by VSELP processing. The characteristics of the encoded noise fluctuate randomly from frame to frame, introducing a "swirling" effect to the coder output. In experiments with a computer simulation of the algorithm, we have found that much of the problem is due to undesirable variations in the quantized parameters of the VSELP model from one frame to the next. We have obtained a performance improvement when the spectral information in VSELP is encoded with the new reduced-fluctuation quantizer described above.

Figure 3:
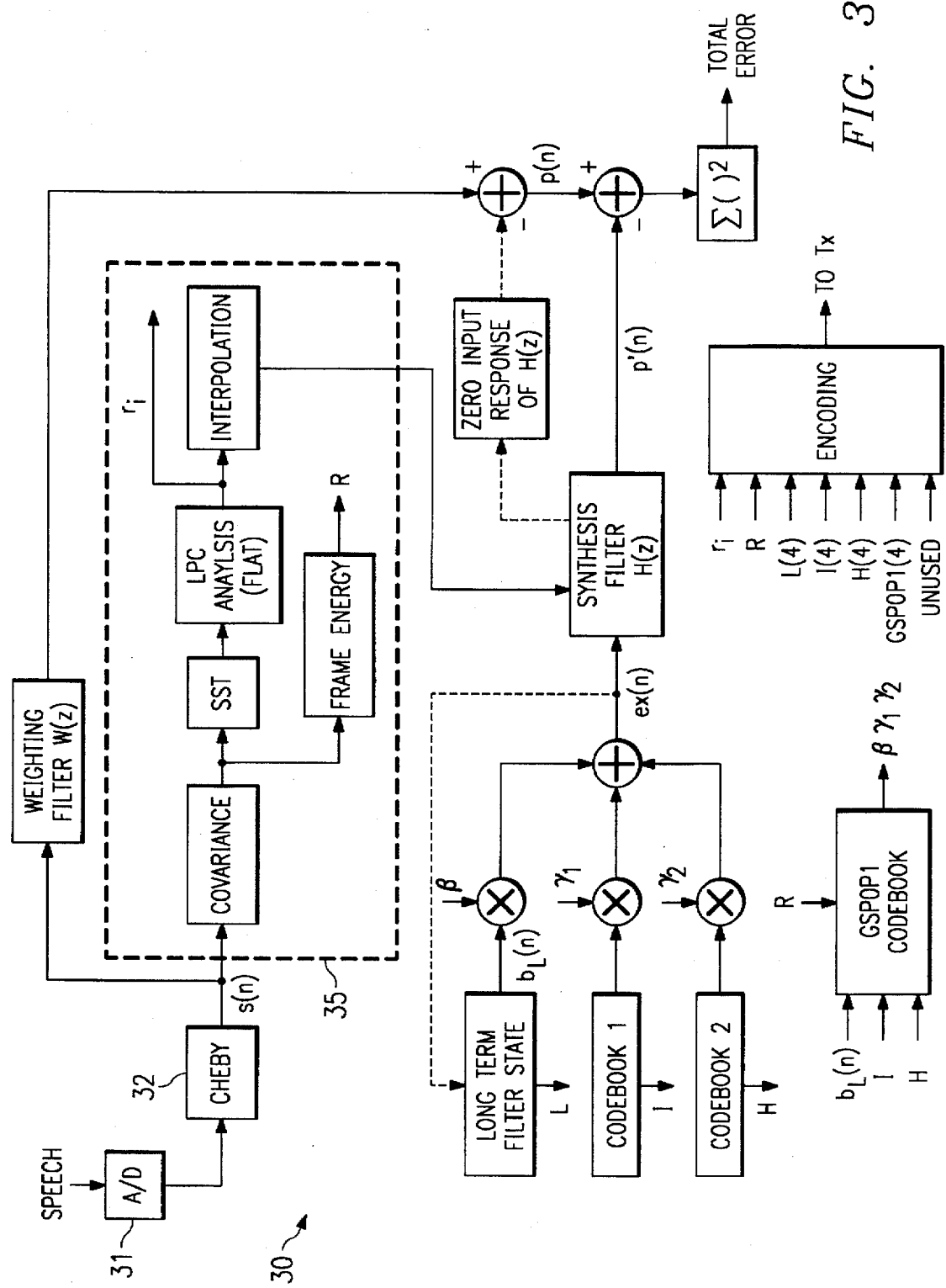
FIG. 3 is a block diagram of a VSELP Encoder.

Referring to FIG. 3, there is illustrated a block diagram of the VSELP Encoder 30. A description of the system is found in EIA/FIA Standards in EIA/TIA Project Number 2215 entitled, "*Cellular System Dual-Mode Mobile Station-Base Station Capability Standard, IS 54,*" issued December 1989. This is published by the Electronic Industries Association Engineering Department, 2001 Eye Street, N.W., Washington, D.C. Referring to FIG. 3, the speech signal is sampled and converted in Analog-to-Digital Converter 31. The speech coding algorithm is a member of a class of speech coders known as Code Excited Linear Predictive Coding (CELP), Stochastic Coding, or Vector Excited Speech Coding. These techniques use codebooks to vector quantize the excitation (residual) signal. The speech coding algorithm is a variation on CELP called Vector-Sum Excited Linear Predictive Coding (VSELP). VSELP uses a codebook which has a predefined structure such that the computations required for the codebook search process can be significantly reduced.

For a more detailed description of an encoder, see U.S. Pat. No. 4,817,157 of Gerson, issued Mar. 28,1989 and incorporated herein by reference. The LPC analysis refers to the analyzer 110. As stated for each block of speech, a set of linear predictive coding (LPC) parameters are produced in accordance with prior art technique by coefficient analyzers. Applicant's improved quantizer can be used with any of these analyzers.

After the analog-to-digital conversion, the signal passes through a fourth order Chebyshev type II highpass filter 32 with a filter response that is 3 db down at 120 Hz and 40 db down at 60 Hz. The covariance, SST and LPC analysis is discussed in Section 2.1.3.3.2.4 on pages 24–30 of the EIA standard cited above. The frame energy value R is discussed in Section 2.1.3.3.2.5 on pages 30 and 31. If the filter is unstable in that the reflection coefficient is equal to or greater than 1.0, then the uninterpolated coefficients are used for that subframe's coefficients. The uninterpolated coefficients for subframe 1 are the previous frame's coefficients.

In the VSELP coder, the power spectrum of the output signal is largely determined by the LPC spectrum, as represented by the reflection coefficients, and the overall power level. Since we believe it is variations in these parameters that introduce the swirling effect, we use the fluctuation-reducing quantizer for these coefficients. In addition, we control the weighting factors $w_1$ and $w_2$ with an adaptive algorithm based on the power level and rate of spectral change of the input speech, such as the one described below.

The adaptive algorithm computes two intermediate variables before estimating the weighing coefficients for the quantizer. The transition strength T is estimated from the change of the power level and spectral tilt from the previous frame, as given by:

$$T=\frac{T-0.2}{1.0-0.2}=1.25(T-0.2)$$

where

-continued $$T = \max\left[\frac{|P - P_{prev}|}{\max(P, P_{prev})}, |K1 - K1_{prev}|\right]$$

and P and K1 are the power level estimate and the first reflection coefficient (spectral tilt) for the input speech frame.

The signal strength S is estimated by comparing the power P for the speech frame with a long-term estimate of the background noise level $P_{noise}$.

If the power level for the input frame is only 3 dB above the noise level, the signal strength is zero, while if the input power is 12 dB above the noise level then the signal strength is one. This is implemented by the formula:

$$S = \frac{P - 1.4 P_{noise}}{4 P_{noise} - 1.4 P_{noise}} = \frac{P - 1.4 P_{noise}}{2.6 P_{noise}}$$

The transition and signal strengths are constrained to be within the range from 0 to 1 by a clamping algorithm. Finally, the weighting coefficients are calculated based on the transition and signal strengths using the formulas:

$$w_1 = 0.75(1-T)(1-S)$$

and $$w_2 = T$$

Figure 4:
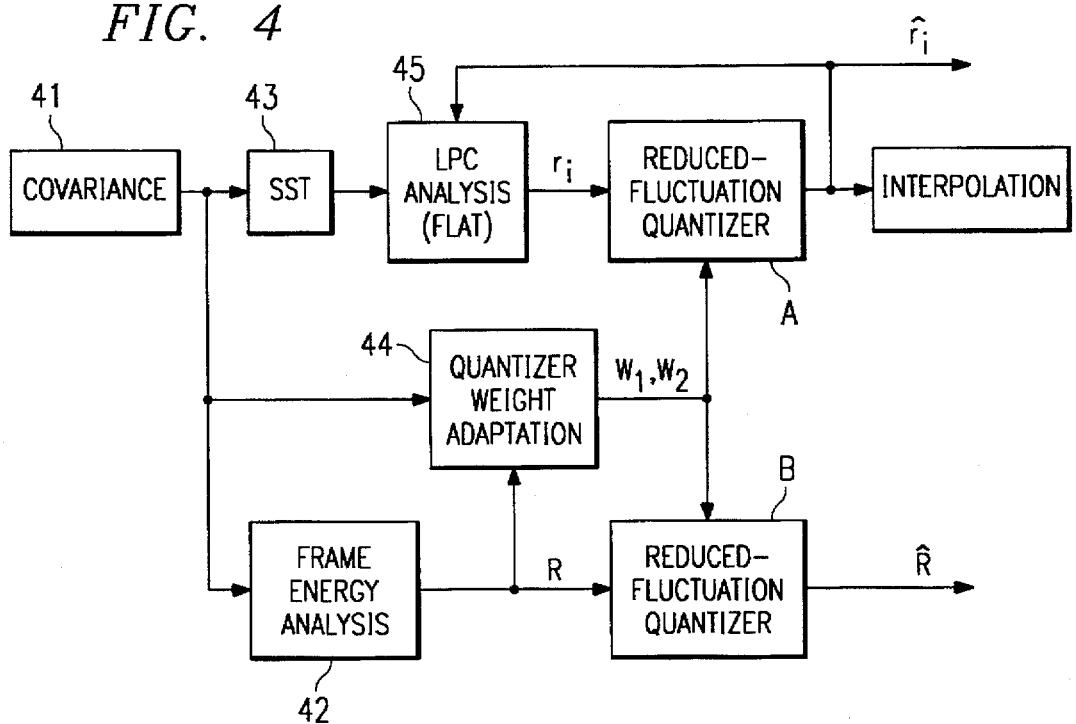
FIG. 4 is a block diagram of a modification to the VSELP Encoder of FIG. 3.
Figure 5:
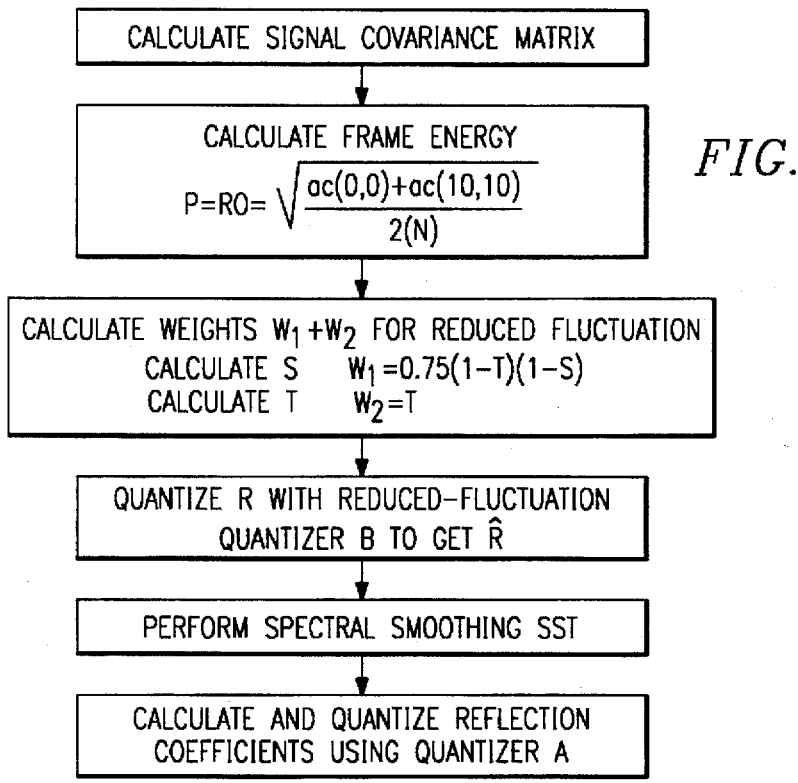
FIG. 5 is a flow chart of the modification to the VSELP Encoder of FIG. 4.

In one preferred embodiment of the present invention, the covariance SST and LPC analysis and quantization is performed under program control using the Encoder of FIG. 3 with the modifications of FIG. 4 in place of the elements within the dashed line 35. In the modified Encoder of FIG. 4, the covariance output at 41 is applied to the frame energy analysis 42 to get Frame energy value R, to SST 43 for spectral smoothing and to quantizer weight adaptation 44 to determine $w_1$ and $w_2$. The SST output passes to FLAT 45 to achieve reflection coefficient $r_i$. The reflection coefficient $r_i$ is applied to reduced fluctuation quantizer A. The R output from Frame analysis 42 is applied to the second reduced fluctuation quantizer B. Quantizers A and B are like FIG. 2. The quantizer weight adaptation calculates weights $w_1$ and $w_2$ using frame energy R from frame energy analysis 42 and the covariance matrix ac(i,j) output from 41. The weight values of $w_1$ and $w_2$ are used to quantize the reflection coefficients $r_i$ and frame energy R. The program steps follow the flow chart of FIG. 5 and the steps as follows:

1. Calculate signal covariance matrix $$ac(i,j) = \sum_{n=0}^{n-0} s(n-i)s(n-j) \text{ for } i = 0,10; j = 0,10$$

2. Calculate frame energy, $$R = \frac{\sqrt{ac(0,0) + AC(10,10)}}{2(N)}$$

where N is length of summation.

3. Update noise power estimate $P_{noise}$
  $P_{noise} = P_{noise} * 1.007$
  if $P_{noise} > R$
  then $P_{noise} = R$ calculate signal strength S, $$S = \frac{R - 1.4 \times P_{noise}}{2.6 \times P_{noise}}$$

constrain S between 0 and 1 calculate $K1 = \frac{ac(0,1)}{ac(0,0)}$ calculate $T = \max\left[\frac{|P - P_{prev}|}{\max(P, P_{prev})}, |K1 - K1_{prev}|\right]$ calculate T=1.25 (T'−0.2)
constrain T between 0 and 1
Calculate weights $w_1$ and $w_2$ for reduced-fluctuation quantizer,
  $w_1 = 0.75 (1-T)(1-S)$
  $w_2 = T$ 4. Quantize R with reduced-fluctuation quantizer B to get $\hat{R}$.
5. Perform spectral smoothing (SST).
6. Calculate reflection coefficients $r_i$ for i=1 to 10 and quantize using reduced fluctuation quantizer A to get $\hat{r}_i$.

When this reduced-fluctuation quantizer is used for the reflection coefficients and overall gain in the VSELP speech coder, the performance is improved for acoustic background noise, while the speech quality is unaffected. When the speaker is not talking, the input signal is at the background noise level with no transitions, so that $w_1$ is 0.75 and $w_2$ is zero and the quantizer reduces fluctuation in the spectral parameters significantly. When speech is present, $w_1$ goes to zero so that the quantizer matches the input signal only and performs in the same way as the standard algorithm.

In addition, the reduced-fluctuation quantizer could be combined with the insertion of "comfort noise" to further increase the naturalness of the background noise. When the input clearly consists only of background noise, the encoded signal could be replaced by artificially generated noise. If it is not clear whether the input is only background noise, the reduced-fluctuation quantizer can be used as described previously.

The use of comfort noise by itself leads to speech dropouts whenever an input frame containing speech is incorrectly detected as a noise-only frame. By combining the reduced-fluctuation quantizer with comfort noise, we can use a conservative approach for detecting noise-only frames so as to minimize the speech dropout problem. In cases where noise-only frames are detected as speech frames, the use of the reduced-fluctuation quantizer will improve the quality of the coder output. Thus, the integrated approach involving comfort noise and the reduced-fluctuation quantizer may lead to improved over-all performance.

Figure 6:
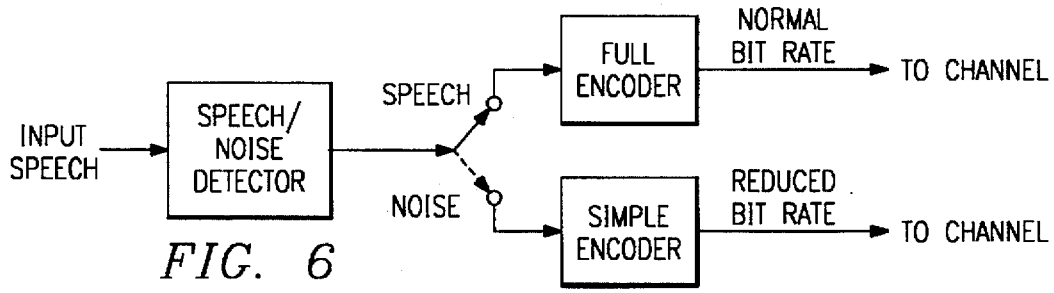
FIG. 6 is a block diagram of a transmitter of a cellular telephone system with a speech/noise detector, a speech encoder including reduced-fluctuation quantizer, and a simple encoder for background noise.
Figure 7:
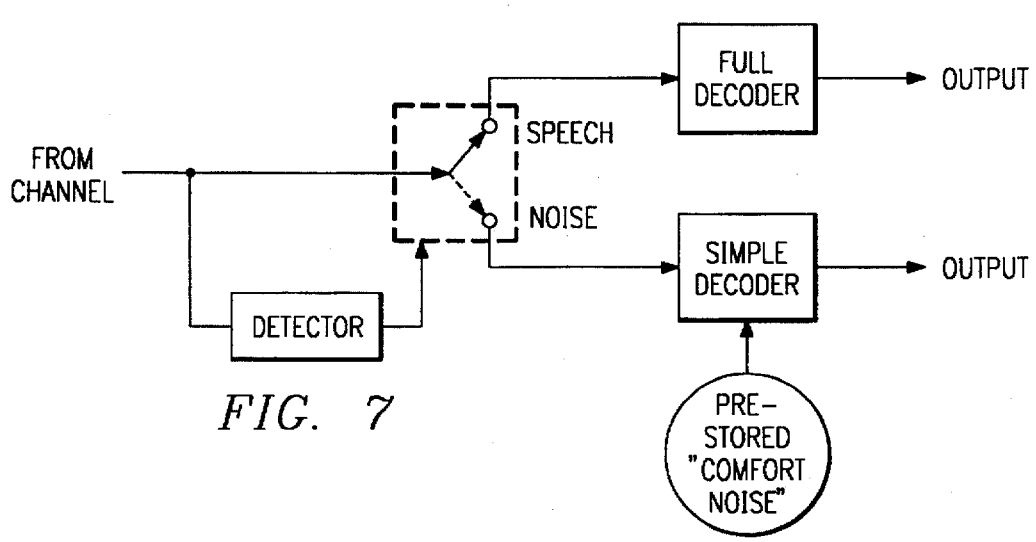
FIG. 7 is a block diagram of the use of the receiver system in connection with a cellular telephone which has a pre-stored comfort noise.

Referring to FIG. 6, there is illustrated a block diagram of an encoder system. In accordance with the system of FIG. 6, the input speech is applied to a speech/noise detector to determine if there is speech or noise at the input. If speech is detected, input is applied through a full encoder with the smoothed quantizer as in FIGS. 2 and 3 or 4 to the channel and to a receiver for decoding the speech and reproducing the speech signal. In the case of a full encoder, the quantizer output is at the normal bit rate. If the speech/noise sensor determines noise, then the simple encoder with reduced bit rate is used. In accordance with another embodiment of FIG. 7 at the receiver if there is speech, to switch the input signal to the full decoder, and if there is no detected speech or noise, to apply the pre-stored comfort noise to the output.

Figure 8:
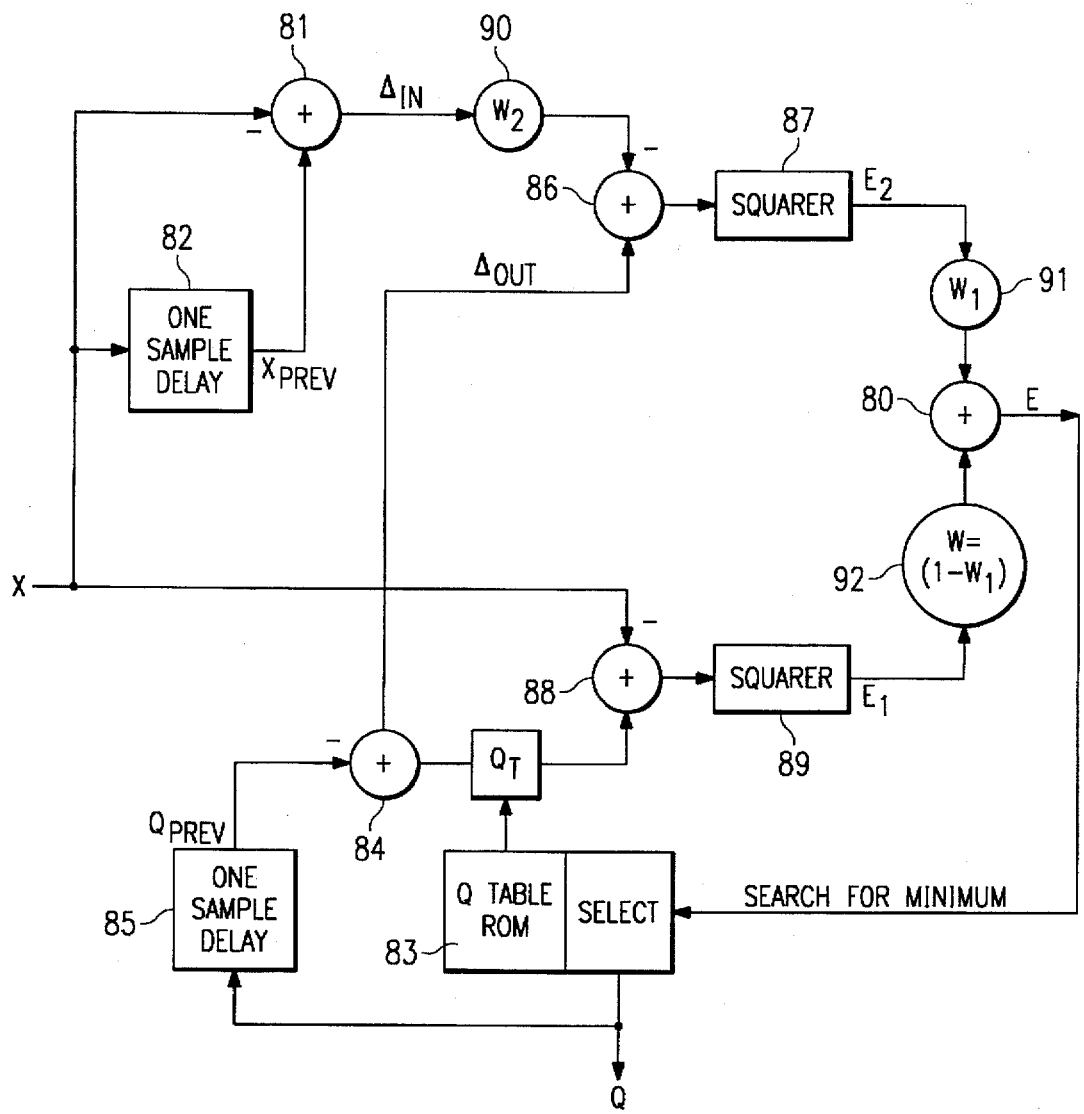
FIG 8 is a block diagram of a quantizer according to another embodiment of the present invention.

The speech noise sensor may include the sensor discussed above in connection with FIG. 6. Referring to the above equation $E=(1-W_1)|Q-X|^2+W_1|\Delta_{out}-W_2\Delta_{in}|^2$ discussed previously, a system following this equation would be like the sketch of FIG. 8 where $\Delta_{in}=X-X_{prev}$ is provided by summer 81 and one sample delay 82 coupled to input X. For all possible values $Q_T$ in a Q table 83 of Q values: output fluctuation $\Delta_{out}=Q_T-Q_{prev}$ is provided out of summer 84 via one sample delay 85, $\Delta_{out}$ is subtracted by $W_2\Delta_{in}$ (weighted value $W_2$ multiplied by $\Delta_{in}$ at multiplier 90) at summer 86, the output from summer 86 is squared in squarer 87 to give fluctuation mismatch $E_2$, and this is multiplied by weighted value $W_1$, at multiplier 91 and applied to summer 80; $Q_T-X$ is provided at summer 88, $Q_T-X$ is squared in squarer 89 to get quantization error $E_1$; and $E_1$ is multiplied by $(1-W_1)$ at multiplier 92 and summed in summer 80 with $(W_1)E_2$ to get error E. The quantized output Q which gives the minimum error E is selected.

Other Embodiments

Although the present invention and its advantages have been described in detail, it should be understood that various changes, substitutions and alterations can be made herein without departing from the spirit and scope of the invention as deigned by the appended claims.

What is claimed is:

1. A signal quantizer with reduced output fluctuations comprising:

means for determining quantization error for a current input;

means for determining mismatch between amount of fluctuation of input vs. output, and a quantizer which generates an output signal based on said quantization error for the current input and said mismatch between said amount of fluctuation of input vs. output.

2. A method of quantizing a signal x comprising the steps of:

determining quantization error for a current input;

determining mismatch between amount of fluctuation of input vs. output; and generating a quantized output signal based on said quantization error and said mount of fluctuation of input vs. output.

3. In a speech encoding system comprising sampling of speech signal and A/D converting to digital signal;

a coefficient analyzer responsive to said digital signal, said coefficient analyzer comprising:

means for determining quantization error for a current input;

means for determining mismatch between amount of fluctuation of input vs. output, and a quantizer which generates an output signal based on said quantization error for the current input and said mismatch between said amount of fluctuation of input vs. output.

4. An encoder system comprising:

a simple encoder with reduced bit rate;

a full encoder operating at normal bit rate with a quantizer with reduced output fluctuations;

a speech/noise detector responsive to input speech for detecting the presence of speech and if noise coupling the noise to said simple encoder and if speech coupling to said full encoder; and said quantizer with reduced output fluctuations in said full encoder comprising:

means for determining quantization error for a current input;

means for determining mismatch between amount of fluctuation of input vs. output, and a quantizer which generates an output signal based on said quantization error for the current input and said mismatch between said amount of fluctuation of input vs. output.

* * * * *